US009566795B2

(12) United States Patent
Dyer et al.

(10) Patent No.: US 9,566,795 B2
(45) Date of Patent: Feb. 14, 2017

(54) COMPACT PINCH VALVE

(71) Applicant: MEMJET TECHNOLOGY LIMITED, Dublin (IE)

(72) Inventors: Geoffrey Philip Dyer, North Ryde (AU); Rommel Balala, North Ryde (AU); Paul Charles Knight, North Ryde (AU); Kianoush Mir Sanaei, North Ryde (AU); Saminda Jayatileke, North Ryde (AU)

(73) Assignee: MEMJET TECHNOLOGY LIMITED (IE)

( * ) Notice: Subject to any disclaimer, the term of this patent is extended or adjusted under 35 U.S.C. 154(b) by 0 days.

(21) Appl. No.: 14/865,317

(22) Filed: Sep. 25, 2015

(65) Prior Publication Data
US 2016/0009102 A1    Jan. 14, 2016

Related U.S. Application Data

(63) Continuation of application No. 14/097,499, filed on Dec. 5, 2013, now Pat. No. 9,180,676.

(60) Provisional application No. 61/752,873, filed on Jan. 15, 2013.

(51) Int. Cl.
*B41J 2/175* (2006.01)
*F16K 7/06* (2006.01)

(52) U.S. Cl.
CPC .......... *B41J 2/17596* (2013.01); *B41J 2/175* (2013.01); *B41J 2/17523* (2013.01); *F16K 7/06* (2013.01); *F16K 7/065* (2013.01)

(58) Field of Classification Search
CPC ..... B41J 2/17596; B41J 2/17523; B41J 2/175; F16K 7/065; F16K 7/06
See application file for complete search history.

(56) References Cited

U.S. PATENT DOCUMENTS

| 3,865,134 A | 2/1975 | Holcomb |
| 4,061,142 A * | 12/1977 | Tuttle ............... A61M 1/30 251/9 |
| 4,484,599 A | 11/1984 | Hanover et al. |
| 2005/0034658 A1 | 2/2005 | Palifka |
| 2011/0025738 A1 | 2/2011 | Rosati et al. |
| 2011/0074873 A1 * | 3/2011 | Ito ............... B41J 2/16532 347/30 |
| 2011/0277303 A1 | 11/2011 | Mallory et al. |
| 2011/0279530 A1 * | 11/2011 | Love ............... B41J 2/16535 347/33 |
| 2012/0293592 A1 | 11/2012 | Hibbard |

FOREIGN PATENT DOCUMENTS

JP    2002019159    1/2002

OTHER PUBLICATIONS

International Search Report and Written Opinion issued Feb. 11, 2014, 16 pages.

* cited by examiner

*Primary Examiner* — Bradley Thies
(74) *Attorney, Agent, or Firm* — Cooley LLP

(57) ABSTRACT

A pinch valve includes first and second pinch arms pivotally mounted about respective pivot axes. A spring interconnects the first and second pinch arms to mutually bias the pinch arms towards each other and provide a pinching force for pinching respective first and second conduits. A cam engages with each of the pinch arms and provides an unpinching force for either one of the pinch arms against the bias of the sprint.

19 Claims, 13 Drawing Sheets

COMPACT PINCH VALVE

This application is a continuation of U.S. application Ser. No. 14/097,499 filed on Dec. 5, 2013, which claims priority of U.S. Provisional Application No. 61/752,873.

FIELD OF THE INVENTION

The invention relates to a compact pinch valve suitable for use in the field of inkjet printers, and more particularly for the control of the flow of ink or air to the printhead of an inkjet printer. The invention will be herein described in this context.

BACKGROUND OF THE INVENTION

In inkjet printers, ink lines are provided to supply ink from an ink reservoir to a printhead. Commonly, there are multiple ink lines (e.g. in a CYMKK printer, there are 5 ink lines connected to the printhead).

It is sometimes necessary for the printhead to be decoupled from the ink lines to enable, for example, replacement of a depleted printhead. Inkjet printers that can prime and de-prime the printhead, and purge air bubbles from the printhead, offer the user distinct advantages. For example, removing a depleted printhead can cause inadvertent spillage of residual ink if it has not first been de-primed prior to decoupling. Further, air bubbles trapped in printheads are a perennial problem in inkjet printers, and there is a need for a means to purge such air bubbles from printheads whenever they are present.

It is known in the prior art to provide a pinch valve for the purpose of enabling priming and depriming of the printhead, and for purging of air bubbles from the printhead. In operation, the pinch valve is located directly upstream of the printhead and the pinch valve selectively controls (i) the flow of ink to the printhead, or (ii) the flow of air to the printhead, such that the printhead can be primed or de-primed, or such that an air bubble can be purged from the printhead.

The closest prior art presently known to the applicant is International Publication WO 2011/143698 (published 24 Nov. 2011), which is herein incorporated by reference. In particular, FIGS. 23-27 of WO 2011/143698 teach a pinch valve which selectively controls the flow of ink or air to the printhead for the purposes discussed above.

The operation of this prior art pinch valve is described, for example, at page 39 through to page 48 of WO 2011/143698. The pinch valve is a 2-way (i.e. ink or air), multi-channel (i.e. CYMKK) valve which selectively directs either ink or air to the printhead. In the illustrated embodiment, there are 5 ink lines and 5 air lines which are selectively opened and closed by the operation of the pinch valve.

The ink lines and air lines pass through the pinch valve and the sections of the lines which pass through the pinch valve are formed of a resilient, plastics tubing which, in a default state of the pinch valve, are pinched closed. The resilient tubing is selectively allowed to open to allow the passage of ink or air through the valve to the printhead.

In the prior art pinch valve, the pinching function is performed by a pair of spring-biased, elongate pinch elements which reciprocate linearly along orthogonal paths. The reciprocation of the elongate pinch elements is controlled by cams which are mounted on a rotatable camshaft which, in turn, is controlled by a motor. The elongate pinch elements are biased to a closed (i.e. pinched) position by springs, and are selectively moved to an open (i.e. unpinched) position by the operation of the motor and cam mechanism.

SUMMARY OF INVENTION

According to a first aspect, there is provided a pinch valve comprising:
  a body;
  a cam rotatably mounted on the body about a cam axis;
  a first pinch arm pivotally mounted on the body about a first pivot axis parallel with the cam axis, the first pinch arm comprising a first cam follower for engagement with the cam and a first pinch element for pinching a first conduit;
  a second pinch arm pivotally mounted on the body about a second pivot axis parallel with the cam axis, the second pinch arm comprising a second cam follower for engagement with the cam and a second pinch element for pinching a second conduit; and
  a biasing mechanism for biasing the first and second pinch arms towards a plane containing the cam axis so as to urge the first and second cam followers against the cam,
wherein the first and second pinch arms oppose each other on either side of the plane.

Preferably, the biasing mechanism is a mutual biasing mechanism engaged with the first and second pinch arms.

Preferably, the biasing mechanism comprises a resilient element interconnecting the first and second pinch arms, the resilient element extending across the central plane.

Preferably, the resilient element comprises a tension spring mounted between a first spring mount location of the first pinch arm and a second spring mount location of the second pinch arm.

Preferably, a radial distance between the first pivot axis and the first spring mount location is greater than a radial distance between the first pivot axis and the first cam follower, and wherein a radial distance between the first pivot axis and the second spring mount location is greater than a radial distance between the second pivot axis and the second cam follower.

Preferably, a radial distance between the first pivot axis and the first spring mount location is greater than a radial distance between the first pivot axis and the first pinch element, and wherein a radial distance between the second pivot axis and the second spring mount location is greater than a radial distance between the second pivot axis and the second pinch element.

Preferably, the plane containing the cam axis is a central plane, the first pivot axis being located to a first side of the central plane, and the second pivot axis being located to an opposite second side of the central plane.

Preferably, the first pinch element is elongate and configured for pinching a plurality of first conduits, and the second pinch element is elongate and configured for pinching a plurality of second conduits.

Preferably, the cam is mounted on a rotatable camshaft and the pinch valve further comprises a sensor for sensing a rotational position of the camshaft.

Preferably, further comprising a drive mechanism for rotating the cam, wherein rotation of the cam causes selective unpinching of the first or second conduits by urging the first or second pinch arms away from the plane containing the cam axis.

Preferably, the first and second conduits extend transversely with respect to the cam axis.

Preferably, the pinch valve comprises a first inlet corresponding to the first conduit, a second inlet corresponding to the second conduit and a common outlet, wherein the second conduit joins the first conduit downstream of the first pinch element and upstream of the common outlet.

In a second aspect, there is provided an inkjet printhead comprising:
- an ink container;
- a printhead;
- an ink line interconnecting the ink container and the printhead;
- an air line branched from the ink line; and
- a pinch valve as described above for selectively pinching the air and/or ink lines.

BRIEF DESCRIPTION OF DRAWINGS

The invention will now be described in a non-limiting manner with respect to a preferred embodiment in which:—

DETAILED DESCRIPTION OF PREFERRED EMBODIMENT

Reference Numerals Used in FIGs

Pinch Valve 100
  Main Housing or Body 120, 120A, 120B, 120C
    Ink Inlet 121
    Ink Line 122
    Outlet 123
    Air Inlet 124
    Air Line 125
    First Anvil 126A
    Second Anvil 126B
    Camshaft Bearing 127
    First Pin Bearing 128A
    Second Pin Bearing 128B
  End Cover Unit 140
    Motor 142
    Worm Gear 144
    Main Gear 146
    Position Sensor 148
    Reference Marker 148A
  Camshaft 160
    Cam 162
  First (Ink Line) Pinch Arm 180
    First Pin 182
    First Cam Follower 184
    First Spring Mount Location 186
    First Pinch Element 188
  Second (Air Line) Pinch Arm 200
    Second Pin 202
    Second Cam Follower 204
    Second Spring Mount Location 206
    Second Pinch Element 208
  Spring 220

With reference to the FIGs, there is illustrated a pinch valve 100 according to the present invention.

As discussed in the preamble, the pinch valve 100 controls the flow of ink or air to a printhead. The respective flowpaths for ink and air are best understood with reference to FIG. 6, which is a cross-sectional view taken along section 6-6 of FIGS. 2 and 3.

Figure 6:
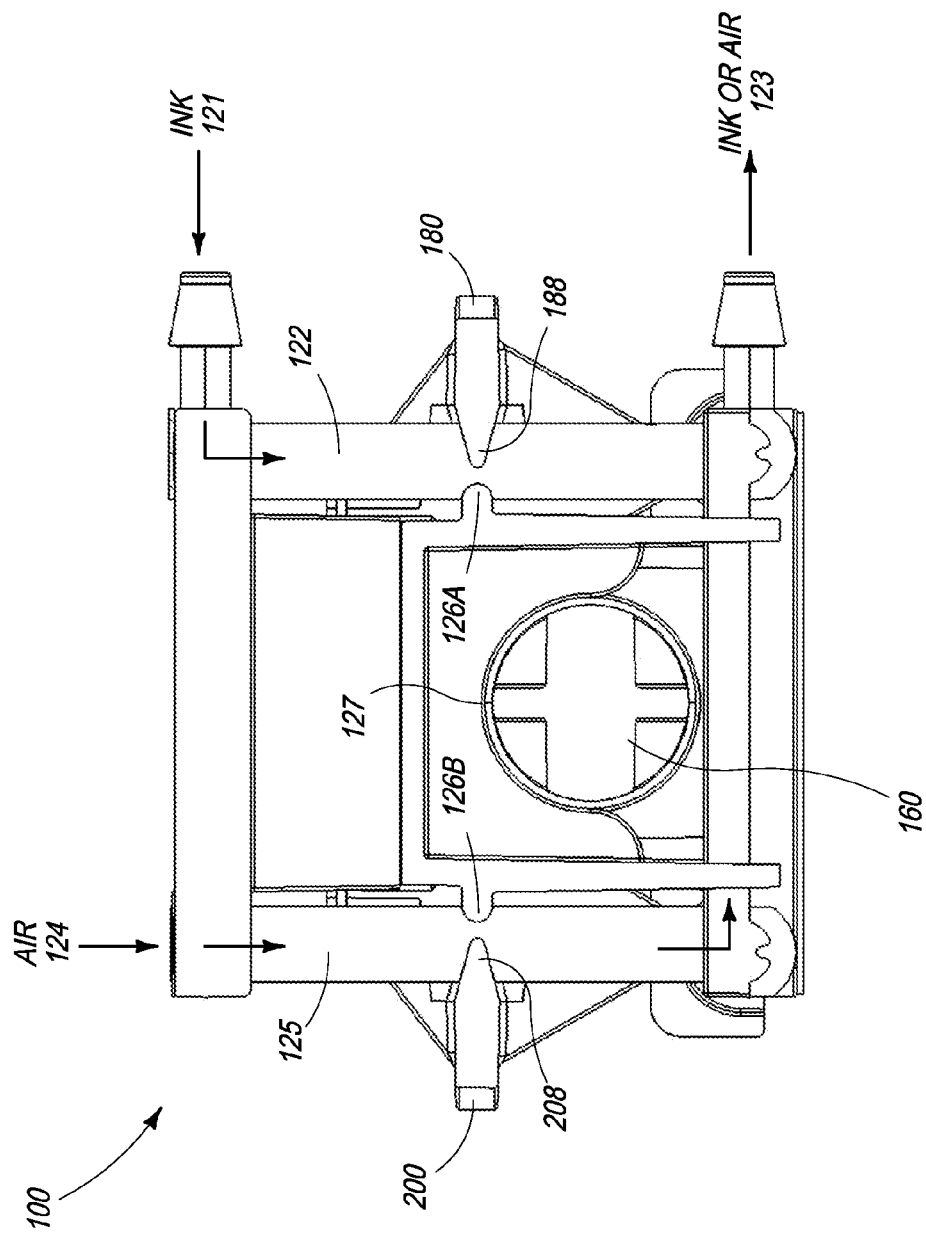
FIG. 6 is a sectional end view of the pinch valve taken along section 6-6; and showing the configuration in which both ink lines and air lines are pinched closed.

Referring to FIG. 6, ink enters the pinch valve in a leftward direction at ink inlet 121. The ink then flows in a downward direction through a first conduit in the form of ink line 122. In FIG. 6, the ink line 122 is shown in the pinched or closed state. In particular, ink line 122 is pinched between (a) the elongate first pinch element 188 of a first pinch arm 180, and (b) a first anvil 126A disposed on the housing 120. It follows that the flow of ink is obstructed or prevented in the illustrated configuration. However, if the ink line 122 was not pinched closed, ink would continue to flow downwardly through ink line 122, and it would exit the pinch valve 100 in a rightward direction from outlet 123. Ink which exits from the outlet 123 of the pinch valve in a rightward direction is then directed to the printhead (e.g. for priming or printing purposes).

Figure 1:
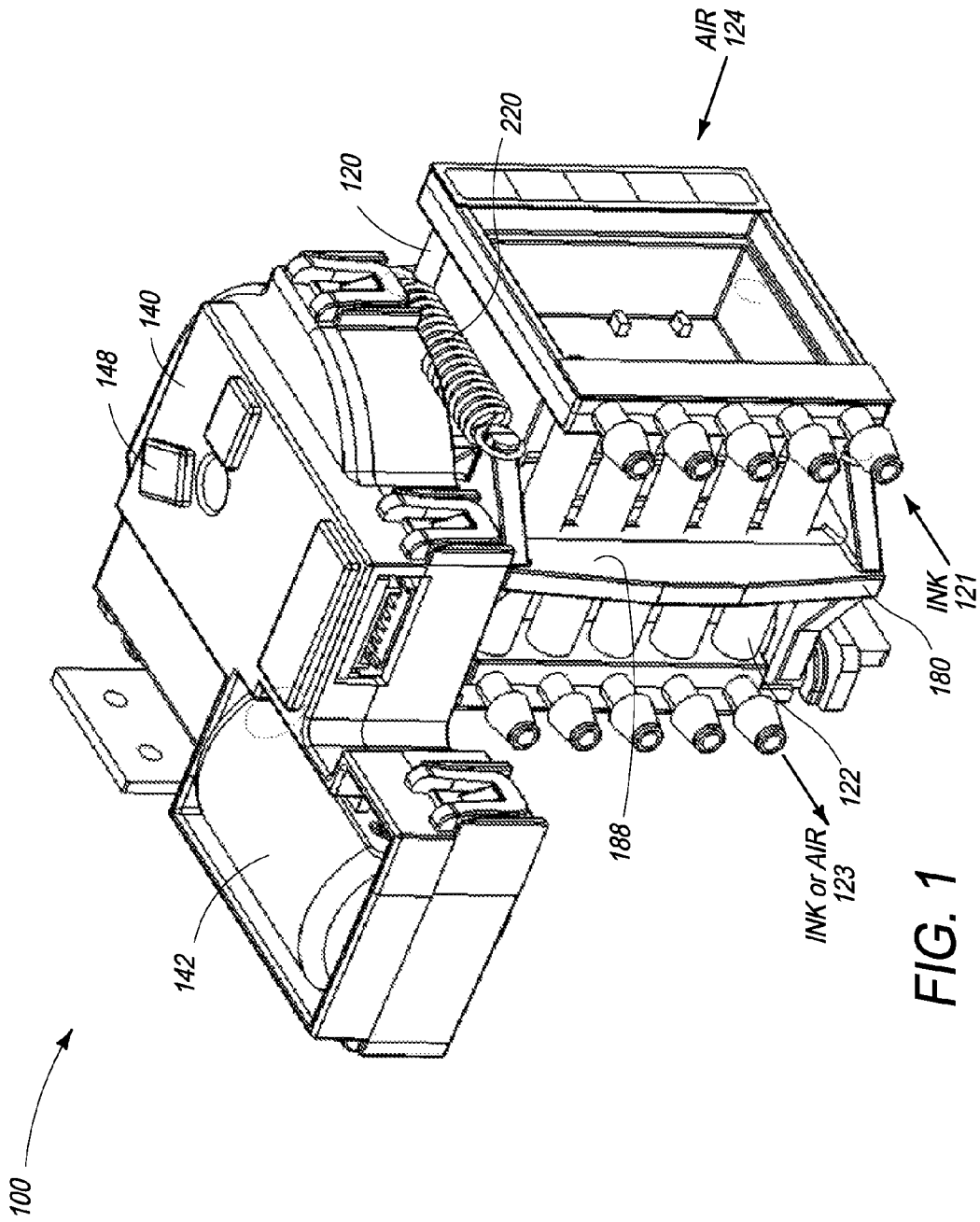
FIG. 1 is perspective view of a pinch valve according to the present invention.
Figure 12:
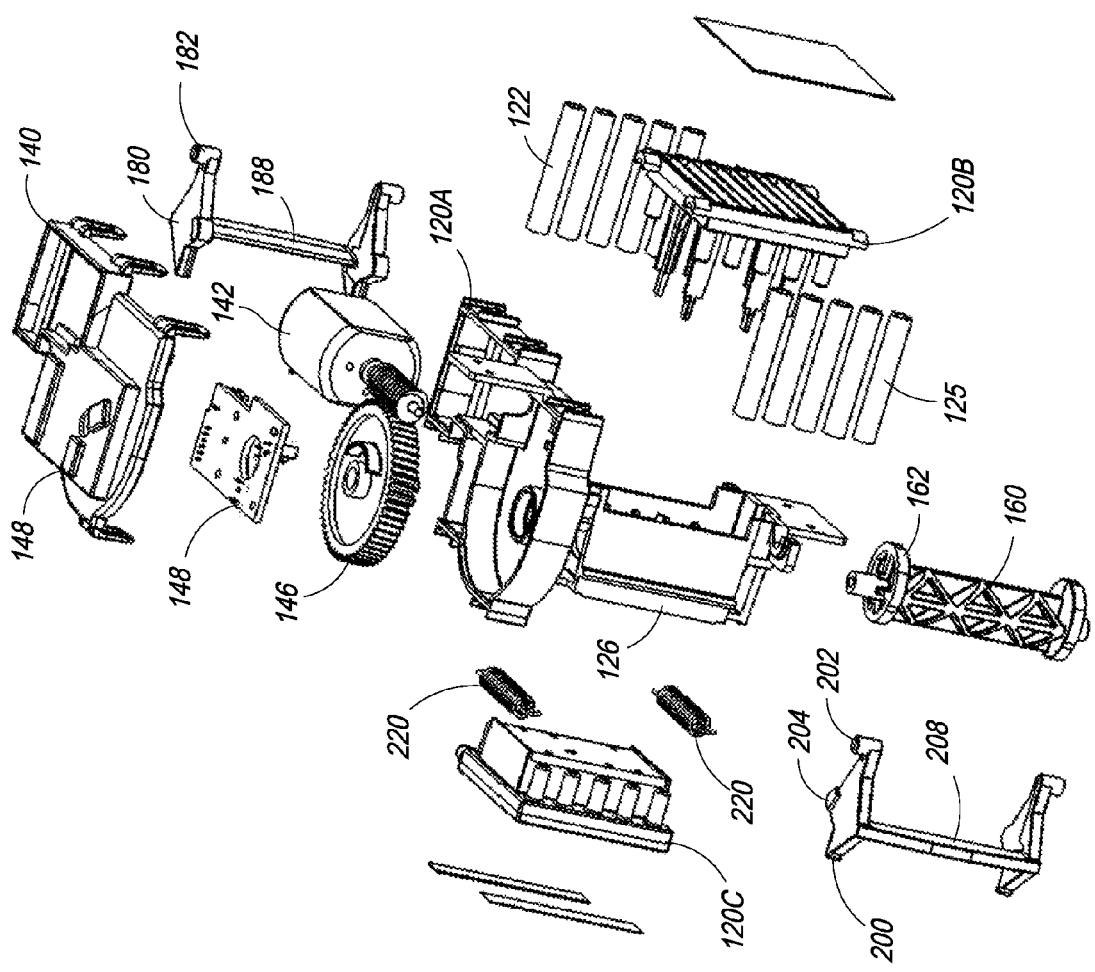
FIG. 12 is an exploded view of the pinch valve.

In FIG. 6, one ink line 122 is shown in its pinched state. However, from FIGS. 1, 2 and 12, it will be appreciated that multiple ink lines 122 may be pinched simultaneously by the first pinch element 188. In general, references herein to "the ink line" implicitly include one or more ink lines.

Referring again to FIG. 6, air enters the pinch valve in a downward direction at air inlet 124. It continues in a downward direction through a second conduit in the form of air line 125. In FIG. 6, the air line 125 is also shown in the pinched or closed state. In particular, air line 125 is pinched between (a) the elongate second pinch element 208 of second pinch arm 200, and (b) a second anvil 126B disposed on the housing 120. It follows that the flow of air is also obstructed in the illustrated configuration. However, if the air line 125 was not pinched closed, air would continue to flow downwardly, it would then be directed in a rightward direction as viewed in FIG. 6 across the bottom of the pinch valve 100 to a point at which it joins ink line 122, and exits the pinch valve in a rightward direction from outlet 123. Air which exits from the outlet 123 is then directed to the printhead (e.g for de-priming purposes).

Thus, it will be appreciated that outlet 123 fluidly communicates with both ink inlet 121 and with air inlet 124. Further, it will be appreciated that the air line 125 joins the ink line 122 downstream of the first pinch element 188.

In FIG. 6, one air line 125 is shown in its pinched state. However, from FIG. 12, it will be appreciated that multiple air line 125 may be pinched simultaneously by the second pinch element 208. In general, references herein to "the air line" implicitly include one or more air lines.

Figure 2:
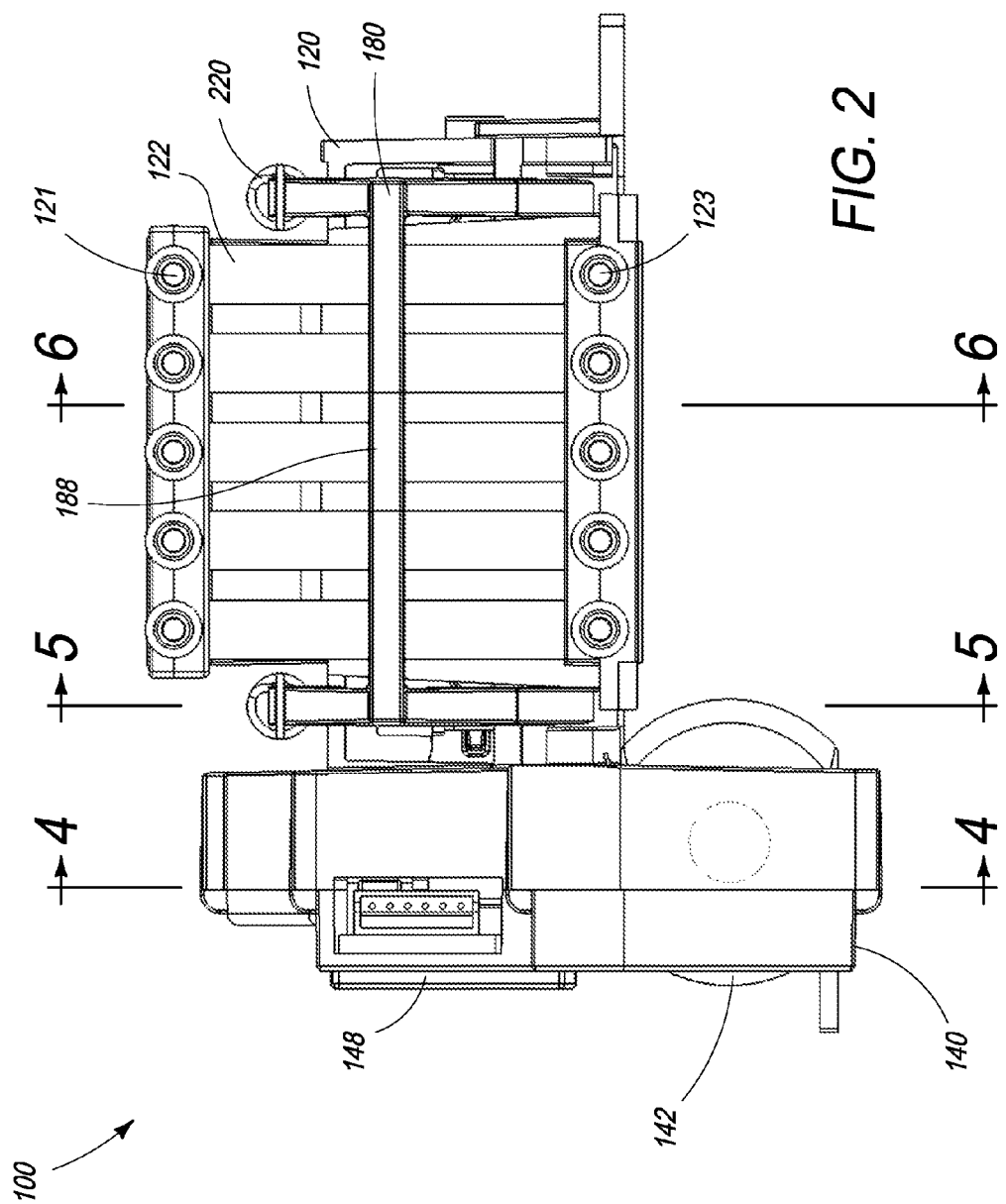
FIG. 2 is an ink line side view of the pinch valve.
Figure 3:
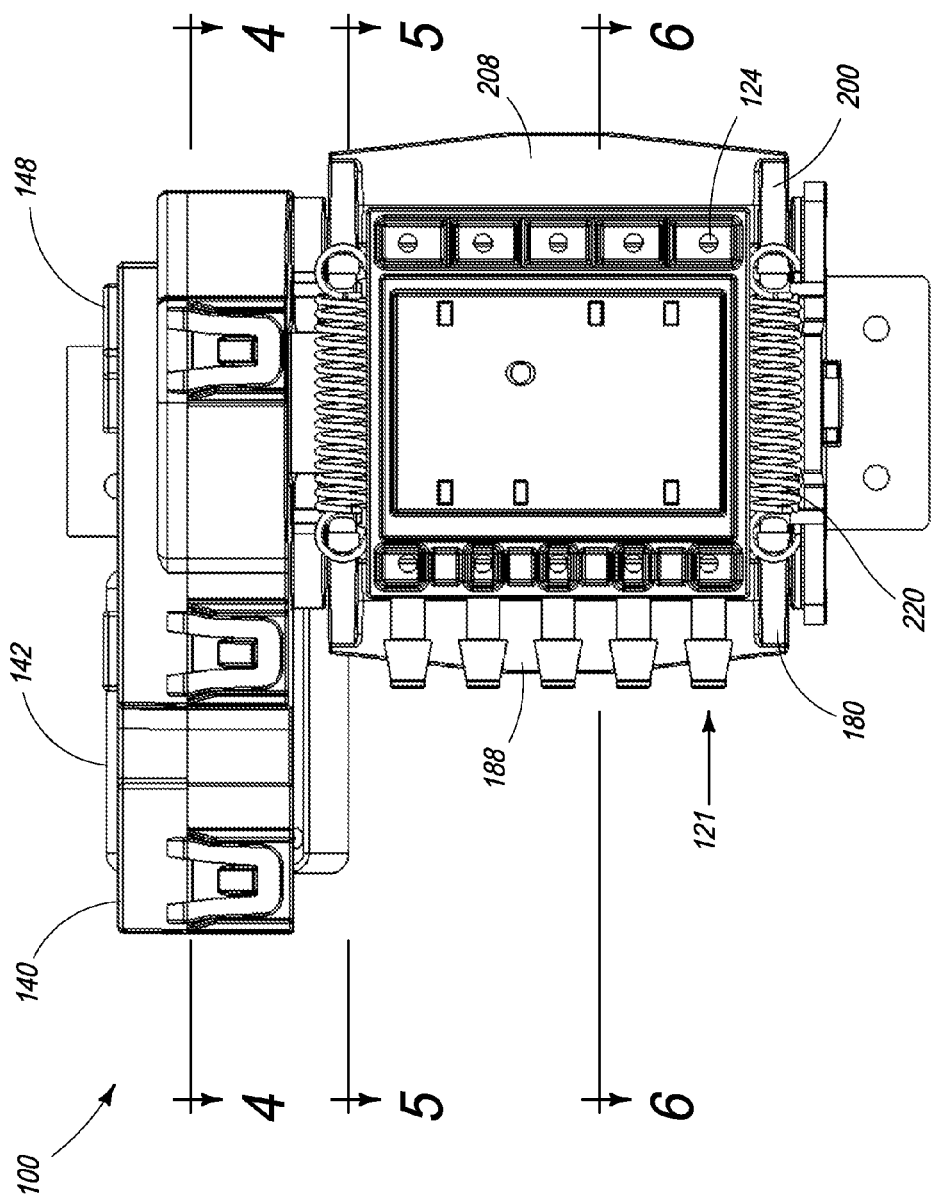
FIG. 3 is a top view of the pinch valve.
Figure 5:
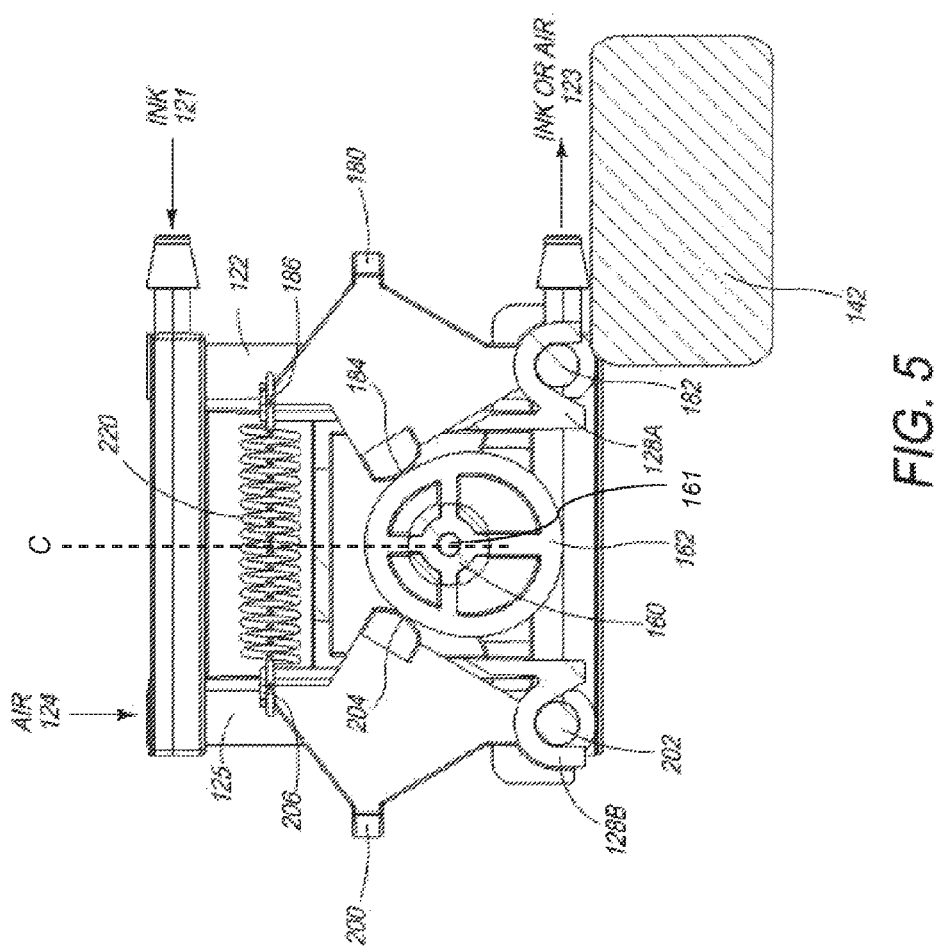
FIG. 5 is a sectional end view of the pinch valve taken along section 5-5 and showing the configuration in which both ink lines and air lines are pinched closed.

The opening and closing of the flowpaths for ink and air is best understood with initial reference to FIG. 5 which is a cross-sectional view taken along section 5-5 of FIGS. 2 and 3.

Referring to FIG. 5, the ink line 122 and air line 125 are again both shown in the pinched or closed configuration (although the lines are partially obscured in FIG. 5 by the first pinch arm 180 and second pinch arm 200, respectively).

The first pinch arm 180 and second pinch arm 200 are symmetrically disposed on either side of a central vertical plane containing the axis of camshaft 160.

The first pinch arm 180 is mounted for pivoting motion about an axis parallel to, and spaced to the right of, a central plane C containing a cam axis 161 by virtue of the engagement of a first pin 182 in a first pin bearing 128A. Thus, the first pinch arm 180 pivots about a first pivot axis defined by the first pin 182, as can be best appreciated with reference to FIG. 5 and FIG. 7B.

In similar regard, the second pinch arm 200 is mounted for pivoting motion about an axis parallel to, and spaced to the left of, the central plane C containing the cam axis 161 by virtue of the engagement of a second pin 202 in a second pin bearing 128B. Thus, the second pinch arm 200 pivots about a second pivot axis defined by the second pin 202, as can be best seen with reference to FIG. 5 and FIG. 7A.

The first pinch arm 180 and the second pinch arm 200 are urged together, towards the central plane containing the camshaft axis, by virtue of a pair of tension springs 220 which are mounted between a first spring mount location 186 and a second spring mount location 206 of respective first and second pinch arms. The pair of tension springs 220 are axially spaced along the length of the camshaft. In alternative embodiments, other biasing means (e.g. resilient cords or loops) may be employed. In the configuration shown in FIG. 5, and with reference again to FIG. 6, the springs 220 cause (a) the elongate first pinch element 188 to pinch the ink line 122 against the first anvil 126A such that the ink line is normally closed, and (b) the elongate second pinch element 208 to pinch the air line 125 against the second anvil 126B such that the air line is normally closed.

With comparative reference to FIG. 5 and FIG. 6 (and also FIG. 11), it will be noted that the radial distance between the pins 182, 202 and the spring mount locations 186, 206 is greater than the radial distance between the pins 182, 202 and the elongate pinch elements 188, 208. This results in the pinching force being greater than the spring force, by virtue of the mechanical advantage (i.e. leverage) provided. This allows usage of spring(s) having a relatively low spring constant compared to the requisite pinch force and, consequently, a lower torque motor for rotating the camshaft. For example, when the radial distance between the pins 182, 202 and the spring mount locations 186, 206 is about 1.5 times greater than the radial distance between the pins 182, 202 and the elongate pinch elements 188, 208, this results in the pinching force being about 50% greater than the spring force.

The un-pinching of the air line 125 will now be described with reference to FIG. 7A.

Figure 7:
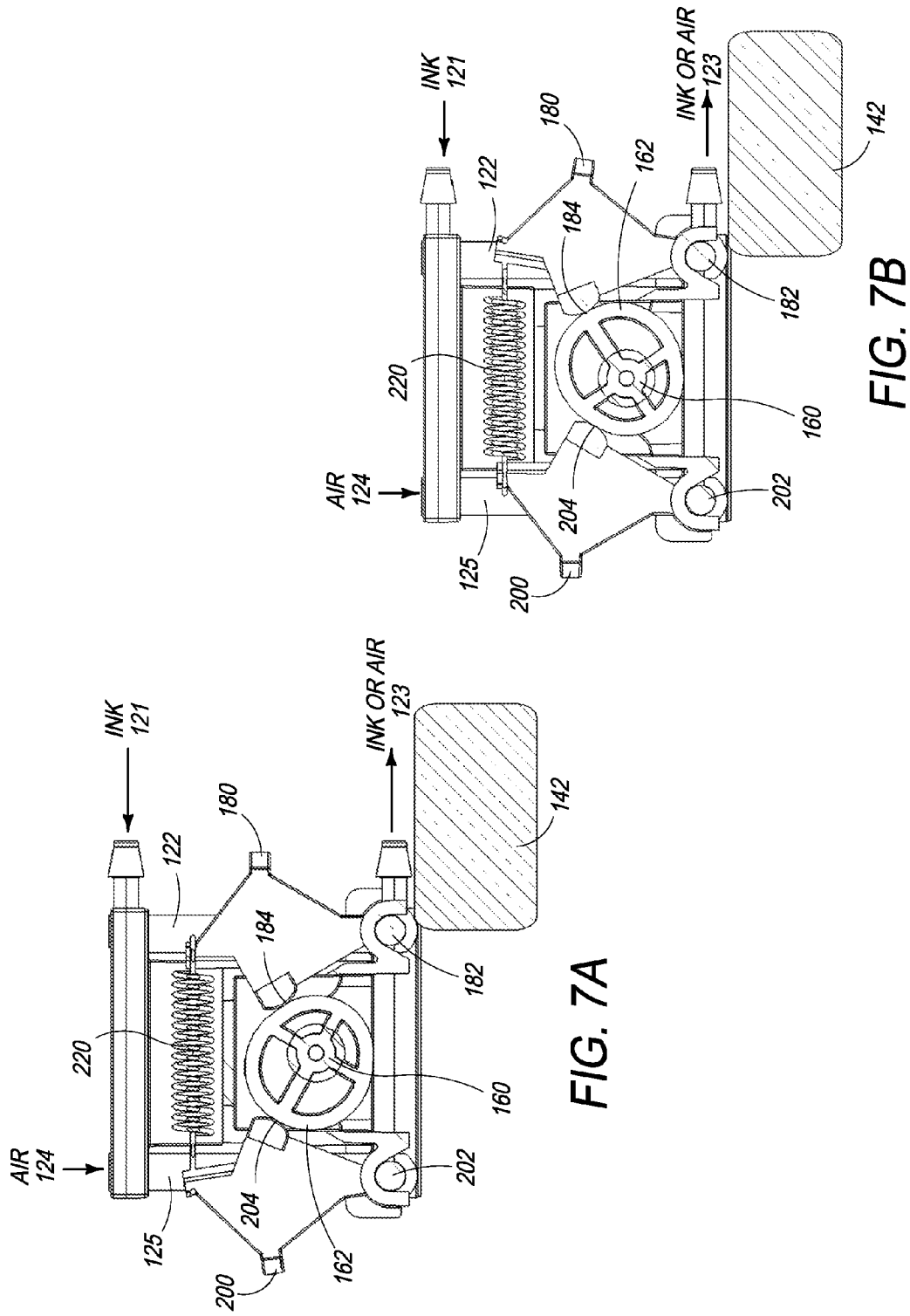
FIG. 7A is a sectional end view of the pinch valve taken along section 5-5 and showing the configuration in which the ink lines are pinched closed and the air lines are allowed to open.
FIG. 7B is a sectional end view of the pinch valve taken along section 5-5 and showing the configuration in which the ink lines are allowed to open and the air lines are pinched closed.

In FIG. 7A, camshaft 160 has been rotated such that the cam 162 has adopted a "ten o'clock" position. In this "ten o'clock" position, the second cam follower 204 has been urged in a leftward direction such that the second pinch arm 200 has been pivoted in a counter-clockwise direction against the bias of spring 220. It will be noted that there are a pair of axially spaced second cam followers 204, as can be best seen in FIG. 11, which align with the pair of axially spaced cams 162. It will be understood that, as the second pinch arm 200 has been forcibly pivoted by the cams in a counter-clockwise direction, the elongate second pinch element 208 has been moved away from the second anvil 126B such that the resilient air line 125 has been allowed to open. In this configuration, the printhead can now be de-primed. It will also be noted that, as air line 125 is opened, the load on springs 220 is increased, and, advantageously, the pinching force on the ink line 122 is concomitantly increased ensuring that no ink can enter the printhead during de-priming.

The un-pinching of the ink line 122 will now be described with reference to FIG. 7B.

In FIG. 7B, camshaft 160 has been rotated such that the cam 162 has adopted a "two o'clock" position. In this "two o'clock" position, the first cam follower 184 has been urged in a rightward direction such that the first pinch arm 180 has been pivoted in a clockwise direction against the bias of spring 220. Again, it will be appreciated that there are a pair of axially spaced cam followers 184, as can be best seen in FIG. 11. It will be understood that, as the first pinch arm 180 has been forcibly pivoted by the cams in a clockwise direction, elongate first pinch element 188 has been moved away from the first anvil 126A such that the resilient ink line 122 has been allowed to open. In this configuration, the printhead can now be primed and/or printing can occur. It will also be noted that, as ink line 122 is opened, the load on springs 220 is increased, and, advantageously, the pinching force on the air line 125 is increased ensuring that no air can enter the printhead during priming or normal printing.

Figure 4:
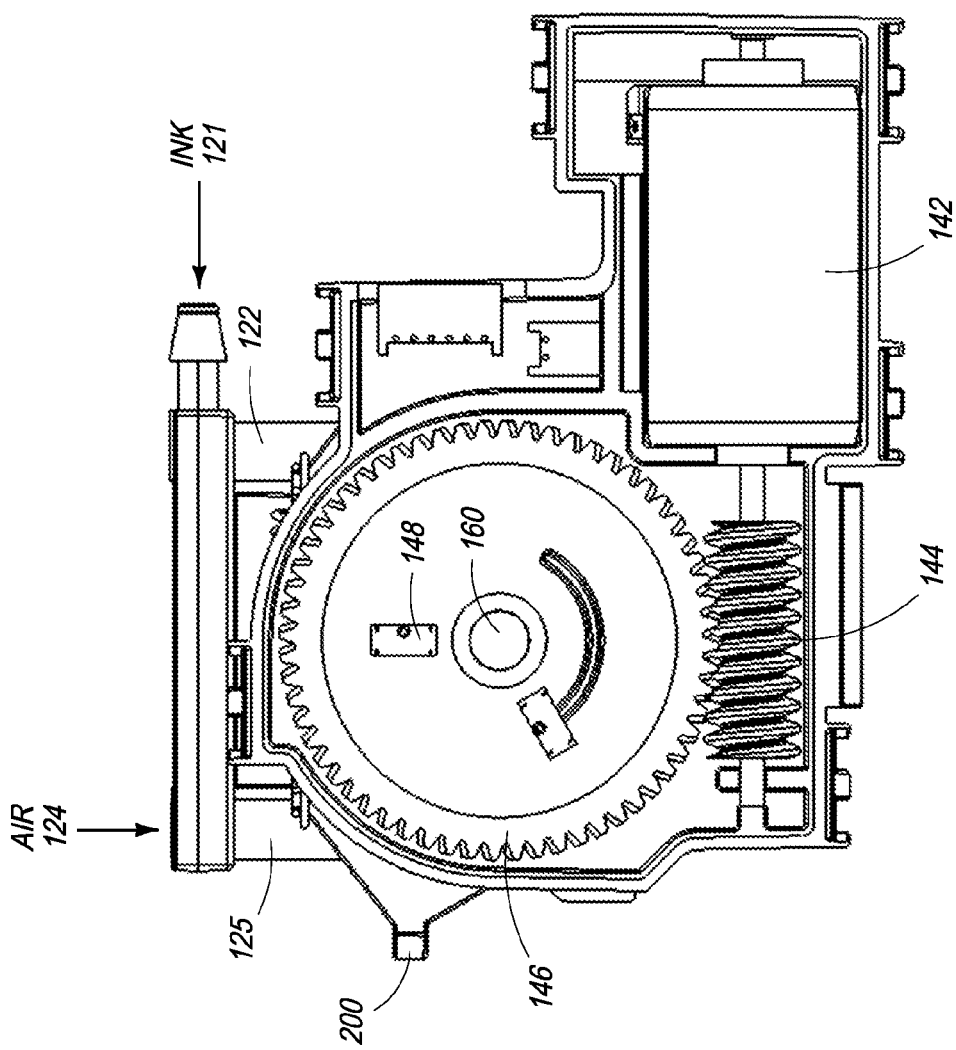
FIG. 4 is an end view of the pinch valve taken along section 4-4 and with the end cover removed.

The control of the camshaft will now be described with reference to FIG. 4, which is a view taken along section line 4-4 of FIGS. 2 and 3.

Camshaft 160 is rotatably coupled to main gear 146 which is accommodated within end cover unit 140. Also accommodated within end cover unit 140 is a motor 142. Motor 142 drives worm gear 144 which, in turn drives main gear 146, and hence camshaft 160. An optical position sensor 148 cooperates with a reference marker 148A provided on the main gear 146 such that a control system can ascertain the rotational position of the main gear 146, and hence the camshaft 160. Thus, the pinch valve can be controlled to (a) prevent the flow of both ink and air as shown in FIGS. 5 and 6, or (b) allow the flow of air, but not ink, as shown in FIG. 7A, or (c) allow the flow of ink, but not air, as shown in FIG. 7B. In an alternative embodiment, an electrical position sensor may be used in combination with one or more electrical contacts on the main gear 146.

The assembly of the pinch valve will now be briefly described with reference to FIGS. 8-12. However, the person of skill in the art will readily appreciate that a range of assembly methodologies is possible.

Figure 8:
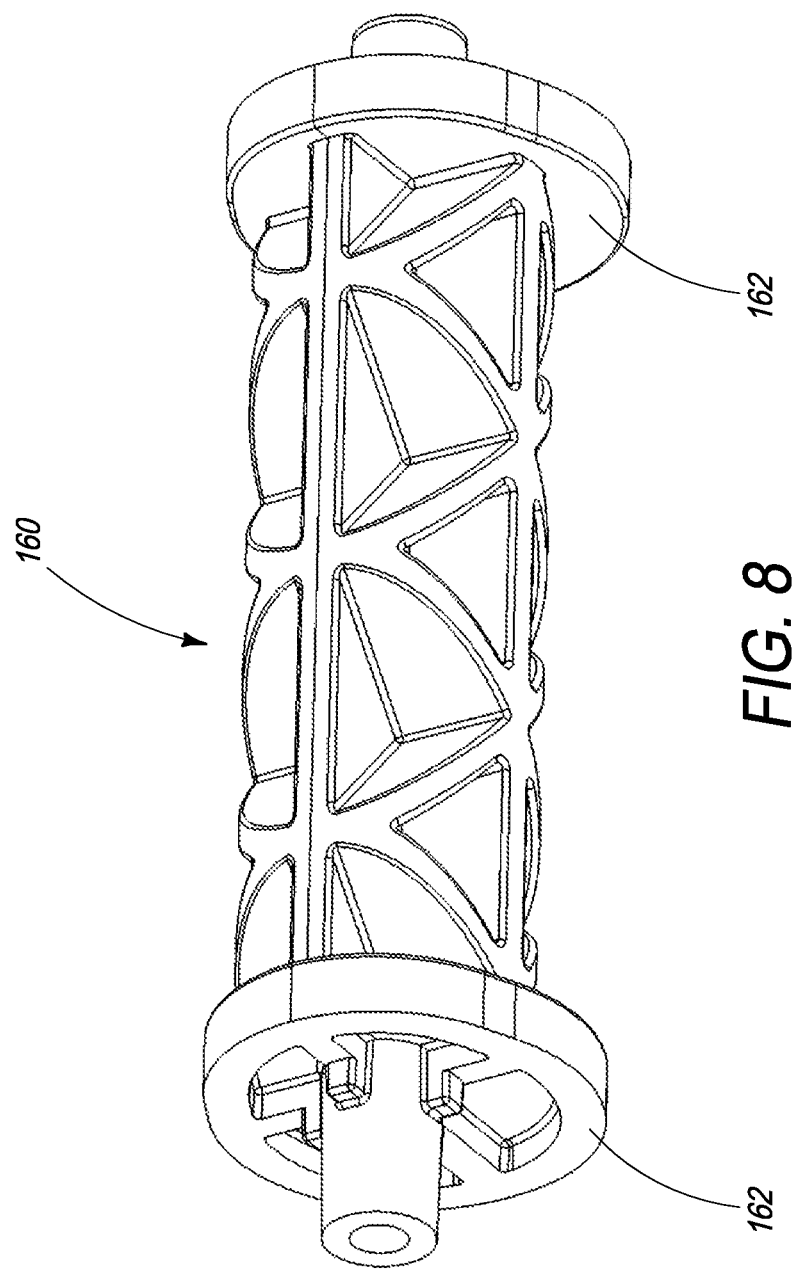
FIG. 8 is a perspective view of the camshaft.
Figure 9:
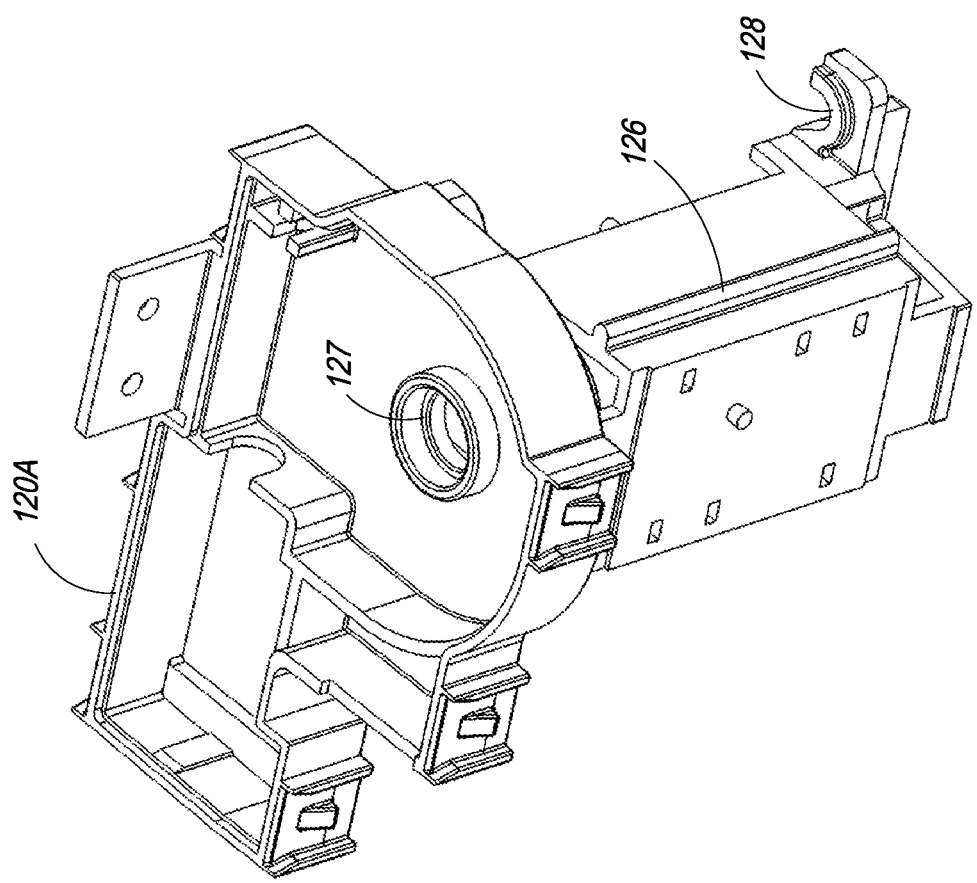
FIG. 9 is a perspective view of the main portion of the main housing.
Figure 10:
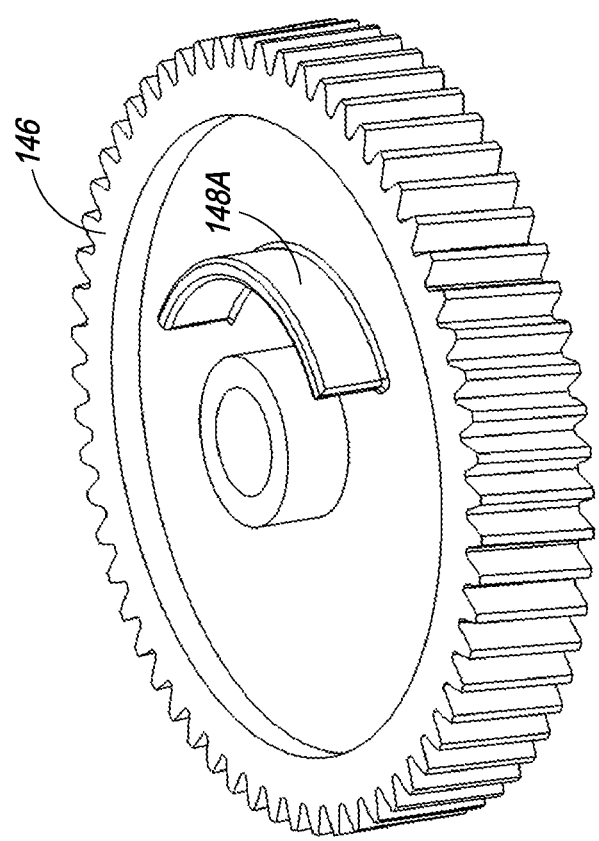
FIG. 10 is a perspective view of the main gear.

Referring firstly to FIGS. 8 and 9, the camshaft 160 of FIG. 8 is inserted into the housing 120A of FIG. 9. Once the camshaft is rotatably mounted within housing 120A, main gear 146 of FIG. 10 can be mounted, via splining, keying or the like, to the camshaft.

Figure 11:
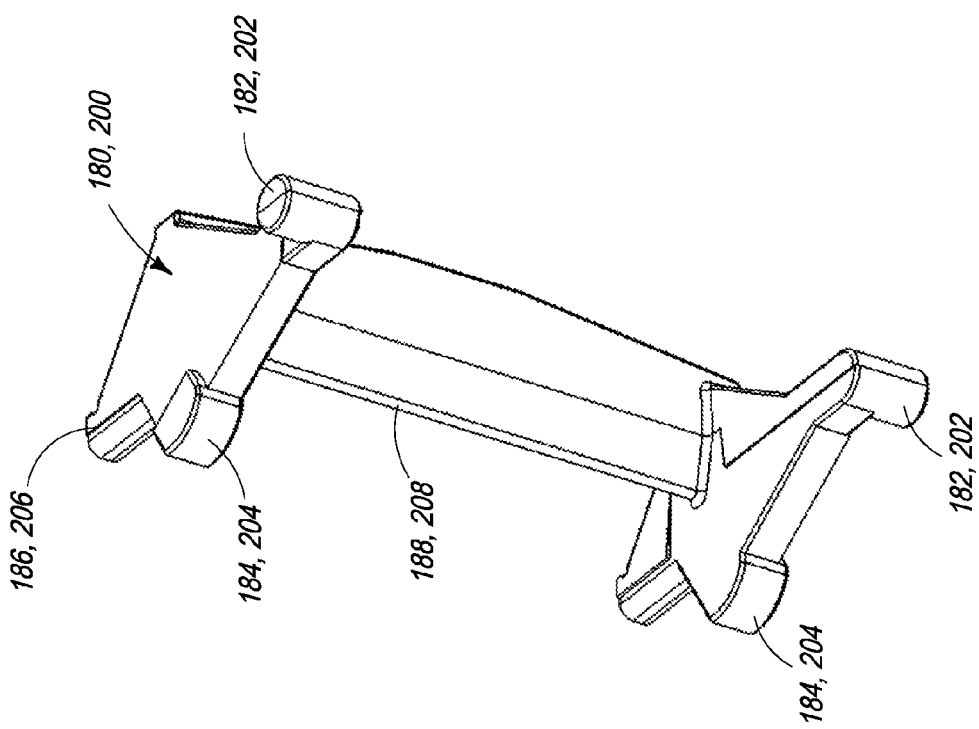
FIG. 11 is a perspective view of a pinch arm (either the first pinch or the second pinch arm)

The first pinch arm 180 and second pinch arm 200 of FIG. 11 can then be mounted to the housing 120A. This is achieved by seating the pins 182, 202 in the pin bearings 128A, 128B of the housing 120A.

A lower portion of the housing 120B is then joined with housing 120A to thereby capture the pins 182, 202 in their seats. Lower portion of housing 120B also includes supports for supporting the underside of the camshaft, and spigots for mounting the lower ends of the ink lines 122 and air lines 125. Further, lower portion 120B also includes ink/air outlet 123, as well as conduits extending across the bottom of the lower portion 120B for allowing communication of the air lines 125 with the ink/air outlet 123.

At this point, the springs can be engaged with the spring mount locations 186, 206.

An upper portion of the housing 120C can likewise be joined with the housing 120A. Upper portion of housing 120C also includes spigots for mounting the upper ends of the ink lines 122 and air lines 125. Upper portion 120C further includes ink inlet 121 and air inlet 124.

Finally, the end cover unit 140, including the motor 142 and worm gear 144 and position sensor 148 can be introduced such that the worm gear 144 engages with the main gear 146.

Figure 13:
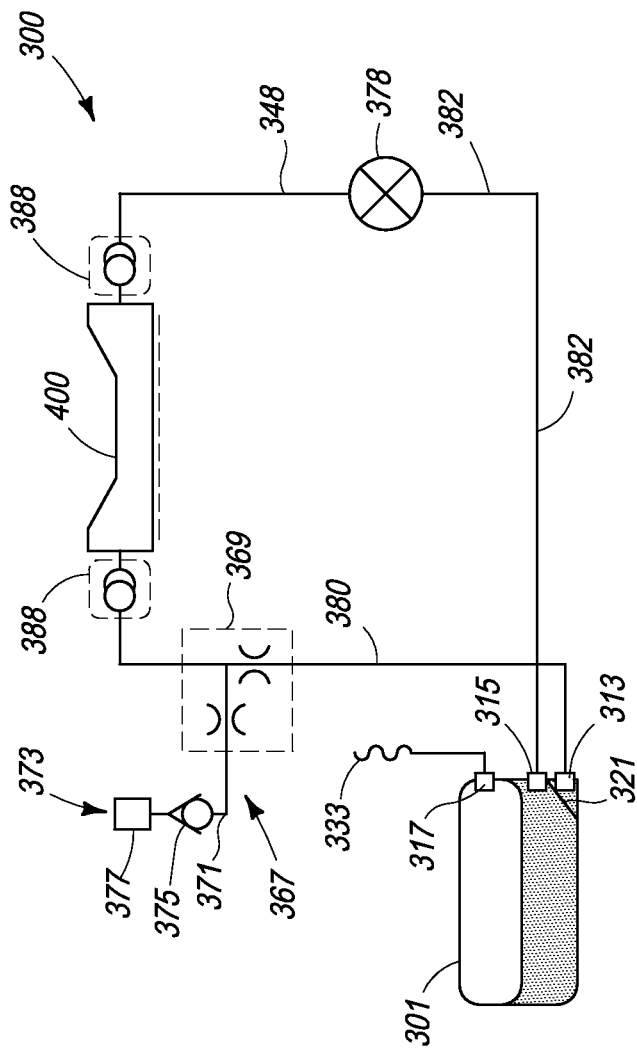
FIG. 13 schematically shows the pinch valve in the context of an inkjet printer.

FIG. 13 shows an ink delivery system 300 described in US Patent Publication 2011/0279562 (the contents of which are incorporated herein by reference), which is suitable for use in connection with the pinch valve described herein. The ink delivery system 300 has a closed loop 348 comprised of plural ink lines connected to an ink container 301. A first ink line 380 is provided between an outlet 313 of the ink container 301 and the printhead 400. A second ink line 382 is provided between the printhead 20 and a return inlet 317 of the ink container 301. The ink container 301 is open to atmosphere via a vent 317 connected to a serpentine vent line 333. An outlet filter 321 is disposed in the ink container 301 for filtering ink delivered to the printhead 20.

As described in US Publication No. 2011/0279557 (the contents of which are incorporated herein by reference) it will be appreciated that the ink container 301 may be in the form of an accumulator (e.g. a float valve accumulator) for regulating a hydrostatic pressure of ink at the printhead 400.

The ink lines of the closed loop 348 are in the form of tubing, and are preferably tubing which exhibits low shedding and spallation in an ink environment. Thermoplastic elastomer tubing is therefore suitable, such as Norprene® A-60-G. However, one of ordinary skill in the art understands that other types of tubing can be used. The tubing of the closed loop 348 is connected to the printhead 400 via supply couplings 388, which enable user-replacement of the printhead 400. The supply couplings 388 and the manner of their connection is described in US Publication No. 2011/0279557.

A reversible pump 378 is provided on the second ink line 382. The pump 378 is preferably a reversible peristaltic pump so that contamination of the pumped ink is prevented. However, one of ordinary skill in the art understands that other types of pumps can be used.

A valve arrangement 367 is provided on the first ink line 380, as illustrated in FIG. 13. The valve arrangement 367 comprises a 2-way pinch valve 369 for pinching the first ink line 380 and/or an air line 371, which is branched from the first ink line 380. The air line 371 is open to atmosphere via an air inlet 373 having a filter 377. A check valve 375 is positioned between the air inlet 373 and the pinch valve 369.

As described in US 2011/0279562, coordination of the pump 378 and the pinch valve may be used to achieve various printer operations, such as printhead priming, printhead de-priming, pulsed priming, normal printing, standby mode etc.

Typically, the ink delivery system 300 has multiple ink lines for delivering inks to multiple ink channels of the printhead 20. In such an arrangement, a single peristaltic pump 378 and a single pinch valve 369 are typically shared between the multiple ink lines. Thus, actuation of the pinch valve may pinch all first ink lines 380 and/or all air lines 371 simultaneously. Likewise, actuation of the pump 378 may pump ink in all second ink lines 382 simultaneously.

In the context of the present disclosure, it will be appreciated that the term "ink" is used to describe any ejectable fluid which is delivered to a printhead. Ejectable fluids may include, for example, colored inks (e.g. dye-based inks, pigment-based inks, UV-curable inks, thermally-curable inks etc.), IR inks, non-colored ink vehicles, functional inks (e.g. 3D printing fluids, nanoparticle fluids) etc.

Throughout this specification and the claims, unless the context requires otherwise, the word "comprise" and its variations, such as "comprises" and "comprising," will be understood to imply the inclusion of a stated integer or step or group of integers or steps but not the exclusion of any other integer or step or group of integers or steps.

The reference to any prior art in this specification is not, and should not be taken as, an acknowledgement or any form of suggestion that such art forms part of the common general knowledge.

The invention claimed is:

1. A pinch valve comprising:
   a body;
   a cam rotatably mounted on the body about a cam axis;
   a first pinch arm pivotally and rotatably mounted on the body about a first pivot axis parallel with the cam axis, the first pinch arm comprising a first cam follower for engagement with the cam and a first pinch element for pinching a first conduit, the first conduit being positioned between the first pinch element and the cam axis;
   a second pinch arm pivotally and rotatably mounted on the body about a second pivot axis parallel with the cam axis, the second pinch arm comprising a second cam follower for engagement with the cam and a second pinch element for pinching a second conduit, the second conduit being positioned between the second pinch element and the cam axis; and
   a resilient element linearly interconnecting the first and second pinch arms between respective first and second spring mount locations, the resilient element mutually biasing the first and second pinch arms towards each other such that movement of the first pinch arm alters a biasing force exerted on the second pinch arm,
   wherein the cam is positioned between the resilient element and the pivot axes; and
   wherein the mutual biasing of the first and second pinch arms towards each other provides a pinching force for pinching the first and second conduits.

2. The pinch valve of claim 1, wherein the resilient element comprises a tension spring.

3. The pinch valve of claim 1, wherein the body comprises first and second anvils, and wherein the resilient element provides a pinching force on a first conduit positioned between the first anvil and the first pinch element and a pinching force on a second conduit positioned between the second anvil and the second pinch element.

4. The pinch valve of claim 1, wherein the first and second pinch arms are symmetrically disposed about a plane containing the cam axis.

5. The pinch valve of claim 1, wherein
   a radial distance between the first pivot axis and the first spring mount location is greater than a radial distance between the first pivot axis and the first pinch element; and a radial distance between the second pivot axis and the second spring mount location is greater than a radial distance between the second pivot axis and the second pinch element.

6. The pinch valve of claim 1, wherein the first pinch element is elongate and configured for pinching a plurality of first conduits, and the second pinch element is elongate and configured for pinching a plurality of second conduits.

7. The pinch valve of claim 1, wherein the cam provides an unpinching force for unpinching either the first conduit or the second conduit against the bias of the resilient element.

8. The pinch valve of claim 7, wherein the cam is configured such that the first and second conduits are not both simultaneously unpinchable.

9. The pinch valve of claim 1, wherein the cam is mounted on a rotatable camshaft and the pinch valve further comprises a sensor for sensing a rotational position of the camshaft.

10. The pinch valve of claim 1, wherein the first and second conduits extend transversely with respect to the cam axis.

11. The pinch valve of claim 1 comprising a first inlet corresponding to the first conduit, a second inlet corresponding to the second conduit and a common outlet, wherein the second conduit joins the first conduit downstream of the first pinch element and upstream of the common outlet.

12. An inkjet printer comprising:
    an ink container;
    a printhead;
    an ink line interconnecting the ink container and the printhead;
    an air line branched from the ink line; and
    a pinch valve for pinching the air and/or ink lines, said pinch valve comprising:
        a body;
        a cam rotatably mounted on the body about a cam axis;
        a first pinch arm pivotally and rotatably mounted on the body about a first pivot axis parallel with the cam axis, the first pinch arm comprising a first cam follower for engagement with the cam and a first pinch element for pinching the ink line, the first conduit being positioned between the first pinch element and the cam axis;
        a second pinch arm pivotally and rotatably mounted on the body about a second pivot axis parallel with the cam axis, the second pinch arm comprising a second cam follower for engagement with the cam and a second pinch element for pinching the air line, the second conduit being positioned between the second pinch element and the cam axis; and
        a resilient element linearly interconnecting the first and second pinch arms between respective first and second spring mount locations, the resilient element mutually biasing the first and second pinch arms towards each other such that movement of the first pinch arm alters a biasing force exerted on the second pinch arm,
    wherein the cam is positioned between the resilient element and the pivot axes; and
    wherein the mutual biasing of the first and second pinch arms towards each other provides a pinching force for pinching the ink and air lines.

13. The printer of claim 12, wherein the resilient element comprises a tension spring.

14. The printer of claim 12, wherein the body comprises first and second anvils, and wherein the resilient element provides a pinching force for the ink line positioned between the first anvil and the first pinch element and a pinching force for the air line positioned between the second anvil and the second pinch element.

15. The printer of claim 12, wherein the first and second pinch arms are symmetrically disposed about a plane containing the cam axis.

16. The printer of claim 12, wherein
    a radial distance between the first pivot axis and the first spring mount location is greater than a radial distance between the first pivot axis and the first pinch element; and
    a radial distance between the second pivot axis and the second spring mount location is greater than a radial distance between the second pivot axis and the second pinch element.

17. The printer of claim 12, wherein the first pinch element is elongate and configured for pinching a plurality of ink lines, and the second pinch element is elongate and configured for pinching a plurality of air lines.

18. The pinch valve of claim 12, wherein the cam provides an unpinching force for unpinching either the ink line or the air line against the bias of the resilient element.

19. The pinch valve of claim 18, wherein the cam is configured such that the ink line and the air line are not both simultaneously unpinchable.

* * * * *